United States Patent [19]
Nishio

[11] Patent Number: 5,194,894
[45] Date of Patent: Mar. 16, 1993

[54] COPYING APPARATUS

[75] Inventor: Tomonori Nishio, Kanagawa, Japan

[73] Assignee: Fuji Photo Film Co., Ltd., Kanagawa, Japan

[21] Appl. No.: 794,921

[22] Filed: Nov. 20, 1991

[30] Foreign Application Priority Data

Nov. 22, 1990 [JP] Japan .................. 2-318347
Nov. 22, 1990 [JP] Japan .................. 2-318348
Nov. 22, 1990 [JP] Japan .................. 2-318349

[51] Int. Cl.⁵ ............ G03B 27/34; G03B 27/40; G03B 27/70
[52] U.S. Cl. .................. 355/57; 355/24; 355/51; 355/233; 355/235
[58] Field of Search ........... 355/24, 51, 57, 75, 355/233, 235, 243

[56] References Cited

U.S. PATENT DOCUMENTS

| | | | |
|---|---|---|---|
| 4,110,030 | 8/1978 | Knechtel | 355/24 X |
| 4,158,497 | 6/1979 | Suzuki et al. | 355/51 X |
| 4,192,609 | 3/1980 | Tani et al. | 355/57 X |
| 4,312,587 | 1/1982 | Ariga et al. | 355/233 |
| 4,318,609 | 3/1982 | Knechtel et al. | 355/233 X |
| 4,395,118 | 7/1983 | Komori et al. | 355/75 |
| 4,803,519 | 2/1989 | Asada et al. | 355/51 X |
| 4,933,722 | 6/1990 | Fujiwara | 355/233 |
| 4,957,368 | 5/1976 | Goshima et al. | 355/51 X |
| 4,970,543 | 11/1990 | Ito et al. | 355/24 |
| 5,055,880 | 10/1991 | Fujiwara | 355/235 |

FOREIGN PATENT DOCUMENTS 2-158727 6/1990 Japan .
62262036 11/1991 Japan .

Primary Examiner—Richard A. Wintercorn
Attorney, Agent, or Firm—Sughrue, Mion, Zinn, Macpeak & Seas

[57] ABSTRACT

A copying apparatus is provided with a first scanning unit for scanning a first document to expose a photosensitive material and a second scanning unit for scanning a second document to expose the photosensitive material, and, at a position where the optical path of the scanning light of the first scanning unit and the optical path of the scanning light of the second scanning apparatus align with each other, a zoom lens is disposed to modify magnification. Consequently, a lens used exclusively for a high magnification becomes unnecessary.

26 Claims, 11 Drawing Sheets

COPYING APPARATUS

BACKGROUND OF THE INVENTION

Field of the Invention

The present invention relates to a copying apparatus for copying an image recorded on a document by scanning.

Description of the Related Art

In recent years, a copying apparatus which allows a document, or an original, having a small image area, such as a lantern slide film or the like, has been developed (See Japanese Patent Laid-Open Nos. 62-262036 and 2-158727). when the image recorded on this document is copied, since the image is small, it is necessary to copy with a high magnification (hereinafter referred to as a high magnification document in order to distinguish from an ordinary document). This magnification is set to about 400%. Therefore, for the high magnification copy, a separate dedicated scanning unit is provided, and an independent magnifying lens system is disposed therein. Since the optical path of this lens system must be made to coincide with that of the ordinary document, one of the scanning mirrors disposed along the optical path of the ordinary document is used as a half-mirror so that it reflects the light from the magnifying system onto a photosensitive material while light from the ordinary document may pass it through to guide onto the photosensitive material. In addition, it is also possible to provide a mechanism for guiding the light beams from two optical paths onto the photosensitive material by switching the scanning mirror disposed along the optical path.

However, according to the above-described arrangement, when the half-mirror is used, the attenuation of light caused by this half-mirror is great, and it is necessary to increase the power of a light source, which wastes energy. In addition, if a switching mechanism of the scanning mirror is provided, then it is necessary to control the position of the scanning mirror with excellent accuracy, which can complicate the construction of the switching mechanism.

SUMMARY OF THE INVENTION

In view of the foregoing facts, an object of the present invention is to achieve a copying apparatus which may eliminate the attenuation of light and allow the light beams from the two optical paths to be guided onto the photosensitive material for copying by switching the light beams therefrom without necessitating a special switching mechanism.

A copying apparatus according to the present invention comprises:

a first scanning means having a scanning mirror means for scanning an image recorded on a first document, which is disposed at a predetermined position, by shifting over a predetermined range to expose a photosensitive material;

a second scanning means for moving a second document, which requires a high magnification, to scan an image recorded thereon; and a zoom lens for changing a magnification, which is disposed along a common optical path set at the downstream side of the first scanning mirror means so that the scanning optical path from the first scanning means and that from the second scanning means may coincide with each other.

According to the invention arranged as described above, the image of the first document is scanned by the scanning mirror means and is exposed onto the photosensitive material via the zoom lens. By this zoom lens, the image is reduced or enlarged at a predetermined magnification to be copied onto the photosensitive material. Incidentally, this predetermined magnification is set to about 25% to 200%. Next, the second document which requires a high magnification, for example, a film for a slide or the like whose image area is small, has to be copied by a magnification greater than the above-described magnification (for example, 400%). In the present invention, since the zoom lens is disposed along the optical path common to the scanning optical path for the first scanning means and the scanning optical path for the second scanning means, there is no need for a lens dedicated to the second copy, which requires a high magnification, and the number of parts can be reduced. As a result, a mechanism for copying the second document can be made small.

According to a specific embodiment of the present invention, a retracting means is further provided to retract the above-described scanning mirror means so that, when the image recorded on the second document is copied, the light from the second scanning means passes through the above-described common optical path. Therefore, according to this embodiment, when the image recorded on the second document is copied, since the scanning mirror means is retracted from the common optical path, in order to introduce the light beams from the scanning paths for the first and second scanning means into the common optical path, it is not necessary to use a half-mirror for the scanning mirror means, thus eliminating waste of the amount of light.

A copying apparatus according to another embodiment of the present invention comprises:

a first scanning means having a scanning mirror means for scanning the image recorded on a first document, which is disposed at a predetermined position, and a guide means for guiding the above-described scanning mirror means so as to move along the first document to scan the image recorded thereon by shifting the scanning mirror means over a predetermined range along the guide means;

a zoom lens for changing a magnification, which is disposed on the optical path of the light reflected by the scanning mirror means;

a second scanning means disposed so as to enter a scanning light onto the optical path of the light reflected by the above-described scanning mirror means for scanning the image recorded on the second document, which requires a high magnification; and a retracting means for retracting the above-described scanning mirror means so that, when the second document is scanned by the second scanning means, the scanning light from the second scanning means may be entered into the zoom lens.

In this embodiment, a retracting means is provided to retract the scanning mirror means when the second document is scanned by the second scanning means. Therefore, when the scanned image of the second document which is scanned by the second scanning means is guided toward the zoom lens, the scanning mirror may be retracted by the retracting means. In addition, if the retracting means is provided at one end portion of the guide means, for example, at a position where scanning is initiated, then, since the scanning mirror means can always remain retracted in a stand-by condition, any special operation becomes unnecessary.

According to still another embodiment of the present invention, the above-described retracting means is provided with the above-described guide means which is arranged so as to allow the scanning mirror to be moved from the position where the scanning light from the second scanning means is blocked from being entered into the above-described zoom lens, to the position, where the entrance of light is allowed therein, by curving so as to exceed the above-described predetermined range.

According to this embodiment, the scanning mirror means can be retracted by only moving the scanning mirror means along the curved line beyond the predetermined range.

According to another embodiment, the above-described retracting means is arranged so as to retract the scanning mirror means by rotating it from a position where the scanning light from the second scanning means is blocked from entering the zoom lens, to a position where it is allowed to enter the zoom lens.

In this embodiment, the scanning mirror may be retracted by being rotated, and for example, as a rotating means, only an energizing means such as a motor or a solenoid or a spring need be mounted at this rotational center, which may simplify the arrangement of the retracting means.

The copying apparatus according to another embodiment of the present invention comprises:

A first scanning means for shifting along a first document disposed at a predetermined position to scan an image recorded thereon;

a scanning mirror means having a first scanning mirror, which receives a scanning light from the first scanning means for reflection and a second scanning mirror, which reflects the light reflected by this first scanning mirror, to expose a photosensitive material by the light from the second scanning mirror while shifting the first and second scanning mirrors together over a predetermined range;

a second scanning means for shifting a second document, which requires a high magnification, to scan an image recorded on the second document;

a movement allowing means for allowing the first and second scanning mirrors to move in excess of the predetermined range; and a switching mirror disposed so that, when the first and second scanning mirrors are moved via the movement allowing means in excess of the above-predetermined range, the switching mirror may lie between the first and second scanning mirrors, to enter the scanning light by the second scanning means into the second scanning mirror to expose the photosensitive material by the light reflected from the second scanning mirror. The optical axis of the light reflected by the second mirror when the second document is scanned may coincide with the optical axis of the light reflected by the second scanning mirror when the first document is scanned.

According to this scanned by the first scanning means. The reflected light of the image recorded on the first document is entered onto the photosensitive material via the first and second scanning mirrors of the scanning mirror means so that the photosensitive material is exposed. Next, when the image of the second document, which is scanned by the second scanning means, is exposed onto the photosensitive material, the first and a second scanning mirrors are shifted via the movement allowing means in excess of the predetermined range. Thus, the switching mirror is positioned between the first and second scanning mirrors, and the scanning light from the second scanning means is emitted onto the photosensitive material via the switching mirror to expose the photosensitive material.

Consequently, the scanning mirror does not have to be a half-mirror in order to introduce the light beams from the scanning path by the first and second scanning means to thereby eliminate waste of light. In addition, since, by only increasing the shifting ranges of the first and second scanning mirrors, it becomes unnecessary to change the relative position between the first and second scanning mirrors. Thus first and second shifting mechanisms can be simplified.

The copying apparatus according to another embodiment of the present invention comprises:

a scanning means for shifting along a first document disposed at a predetermined position to scan an image recorded on the first document;

a second scanning means for shifting a second document, which requires a high magnification, to scan an image recorded on the second document;

a scanning mirror means having a first scanning mirror which reflects the scanning light of the first scanning means, and a second scanning mirror which reflects the light reflected from this first scanning mirror, which may be shifted between first and second predetermined positions so that the second scanning mirror may reflect the scanning light from the first scanning means, which is entered at the first predetermined position via the first scanning mirror, to expose the photosensitive material; and a retracting means for retracting the second scanning mirror so that, when the scanning mirror means is shifted from the first predetermined position to the second predetermined position, the scanning light from the second scanning means may coincide with the optical path of the scanning light from the first scanning means, which is reflected by the second scanning mirror, to allow the photosensitive material to be exposed by the scanning light of the second scanning means.

In this embodiment, when the scanning mirror means is shifted from the first predetermined position to the second predetermined position, the second scanning mirror is retracted by the retracting means. Accordingly the optical path of the scanning light from the first scanning means, which is reflected by the second scanning mirror, may coincide with the optical path of the scanning light from the second scanning means, to secure the optical path of the scanning light by the second scanning means to allow the photosensitive material to be exposed.

The copying apparatus according to still another embodiment of the present invention comprises:

a first scanning means for shifting along a first document disposed at a predetermined position to scan an image recorded on the first document;

a second scanning means for shifting a second document, which requires a high magnification, to scan an image recorded on the second document;

a scanning mirror means having a first scanning mirror which reflects the scanning light from the first scanning means and a second scanning mirror which reflects the light reflected by this first scanning mirror so that, when scanning is performed by the first scanning means, it may shift the first and second scanning mirrors together over a predetermined range, to expose the photosensitive material by the light reflected by the second scanning mirror;

a movement allowing means for allowing the first and second scanning mirrors to be shifted in excess of the predetermined range; and a retracting means for retracting the second scanning mirror so that, when the first and second scanning mirrors are shifted via the movement allowing means in excess of the predetermined range, the scanning light from the second scanning means may coincide with the optical path of the scanning light from the first scanning means, which is reflected by the second scanning mirror, to allow the photosensitive material to be exposed by the scanning light of the second scanning means.

According this embodiment, when the first and second scanning mirrors are shifted via the movement allowing means in excess of the predetermined range, the second scanning mirror is retracted by the retracting means so that the photosensitive material may be exposed by the scanning light of the second scanning means.

As described above, the copying apparatus according to the present invention has advantages in that the loss of light is eliminated and, without a special switching mechanism, the light beams from two optical paths may be switched to be guided onto the photosensitive material for copying.

DETAILED DESCRIPTION OF THE PREFERRED EMBODIMENTS

Figure 1:
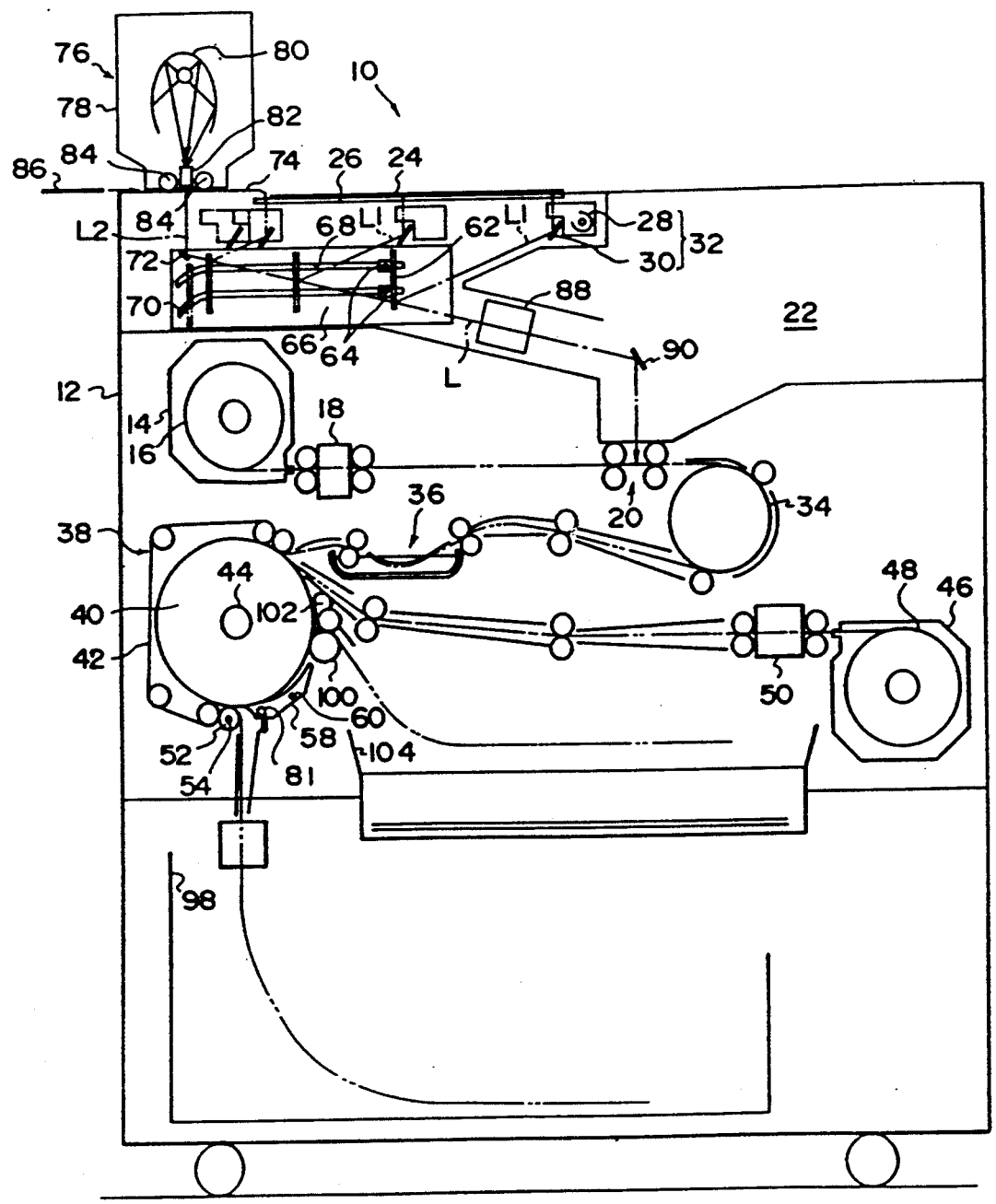
FIG. 1 is a schematic view of an arrangement of a copying apparatus according to the present invention.

FIG. 1 illustrates a schematic view of an arrangement of a copying apparatus 10.

In a base 12 of the copying apparatus 10, a photosensitive material magazine 14 is placed, in which a roll of a photosensitive material 16 is stored. The photosensitive material 16 has a photosensitive halogenated silver, a binder, a pigment providing substance and a reducing agent on its substrate.

In the neighborhood of the photosensitive material magazine 14, a cutter 18 is disposed so that the photosensitive material 16 which is rolled out from the magazine 14 may be cut to a predetermined length. The cut photosensitive material 16 may be conveyed to an exposure portion 20.

Immediately above the exposure portion 20, an exposure apparatus 22 is provided. Above the exposure apparatus 22, a document stand 26 for placing a first document 24, which is formed with a transparent glass plate, is disposed. The first document 24 has a standard format size of A4 or B4 or the like. Below the document stand 26, a light source 28, which forms part of a first scanning means, and a first scanning unit 32, which is comprised of a mirror 30, are disposed so that, by a driving portion (not shown), they may be reciprocally shifted in the leftward and rightward directions of FIG. 1 along the document stand 26. Incidentally, the position where the first scanning unit 32 stands by corresponds to the left side of FIG. 1, from which it is reciprocally shifted once along the document stand 26 so that the image recorded on the first document 24 may be scanned in a line.

The light beams from the light source 28 are illuminated onto the surface of the image recorded on the first document 24, and its reflected image may, via the mirror 30, reach a scanning mirror 62, which is part of a first scanning means, together with the first scanning unit 32. An optical path illustrated by an optical axis L1 in FIG. 1 forms a scanning optical path of the first scanning means.

The surface of the scanning mirror 62 forms a right angle relative to the document stand 26. At both end portions of the scanning mirror 62, a pair of upper and lower pins 64 are mounted, and via these pins 64, the scanning mirror 62 is supported in elongated holes 68, which are formed through a guide rail 66. The elongated holes 68 are formed in parallel to the document stand 26 so that, by a driving mechanism (not shown), the scanning mirror 62 may be shifted along the document stand 26 while maintaining an angle in which the mirror surface forms a right angle relative to the document stand 26. In this case, the movements of the first scanning unit 32 and the scanning mirror 62 are synchronized (amount of movement of the first scanning unit 32: amount of movement of the scanning mirror 62 = 2:1) so that they may travel back and forth along different distances in the same period of time. As a result, the optical axis L of the light beams reflected by the scanning mirror 62 always passes through the same locus while the length of its optical remains constant. The optical path indicated by this optical axis L becomes an optical path common to the above-described optical axis L1 and an optical axis L2.

The end portion of the elongated holes 68 of the guide rail 66, as seen at the left side of FIG. 1, forms a curved portion 70 which is gradually curved in the direction in which it departs from the optical axis L2, to form a retracting means. Consequently, when the scanning mirror 62 is shifted toward this left end portion of FIG. 1, it is gradually shifted in parallel in a direction in which it gradually departs from the document stand 26 to be retracted from above the optical axis L2 (see an imaginary line of FIG. 1 and FIG. 3). In addition, this position corresponds to a position where the scanning mirror 62 does not interfere with the position where a zoom lens 88 exhibits a maximum magnification position (400%). This position is a home position for the scanning mirror 62 at which scanning mirror 62 stands by when copying starts.

A mirror 72 is disposed along an extension of this optical axis L, which lies on the rear surface side of the scanning mirror 62. The mirror 72 forms part of a second scanning means so that it may serve to align the light beams from a second scanning unit 76, which is disposed on a base plate 74 (at the left side of FIG. 1) of the document stand 26, with the above-described optical axis L and to make the length of the optical path constant.

For the second scanning unit 76, a light source 80 and a mirror box 82 are disposed within its casing 78. The light beams illuminated from this light source 80 are emitted from the lower portion of the casing 78 via the mirror box 82 to the above-described mirror 72. Furthermore, to the casing 78, a pair of feeding rollers 84 are mounted with the mirror box 82 interposed therebetween. A space is formed between these feeding rollers 84 and the base plate 74 to insert a second document 86.

The second document 86 is a reversal film, that is, a positive film used to project a lantern slide, on which an extremely small image is recorded as compared with the above-described first document 24. If the second document 86 is placed on the base plate 74 and its one side is inserted into the space, then it is sandwiched by the feeding rollers 84 and the base plate 74 to be conveyed from the left side to the right side of FIG. 1. When it is conveyed, the light beams emitted from the mirror box 82 pass through the film surface and the scanned image reaches the mirror 72.

In this case, if the scanning mirror 62 lies at the home position, then no obstacle will be present between the optical axis L2 of the light reflected by this mirror 72 and the above-described optical axis L.

Coincident with the optical axis L, a zoom lens 88 is disposed to change the magnification. This zoom lens 88 may reduce or enlarge the scanned image passing through this optical axis L from 25% to 400% by being shifted along the optical axis L. Incidentally, the maximum magnification of the first document is 200% and that of the second document is 400%.

For example, when the image is reduced to 50%, the zoom lens 88 is shifted in the right direction of FIG. 1 and, when it is enlarged to 200%, the zoom lens 88 is shifted in the left direction of FIG. 1. Here, although the position of the zoom lens, as the image is enlarged to 200%, and the rightmost position of the scanning mirror 62 coincide with each other, if the image is enlarged to 200%, since only a half area of the front portion of the document stand 26 can be scanned, the scanning mirror 62 does not reach this rightmost position, and the zoom lens 88 and the scanning mirror 62 do not interfere with each other.

The light beams emitted from the zoom lens 88, that is, the scanned image, are reflected by a mirror 90 to reach the above-described exposure portion 20.

Laterally of the exposure portion 20, an inversion roller 34 is disposed, and further, laterally of the inversion roller 34, a water-applying portion 36 is disposed. The photosensitive material 16, after the image is exposed at the exposure portion 20, is inverted and conveyed by the inversion roller 34, and by the water applying portion 36, water is applied thereto as a solvent for forming the image.

Laterally of the water-applying portion 36, a thermal developing transfer portion 38 is disposed, and the photosensitive material to which water is applied is fed therein.

In the meantime, at the side of the base 12 opposite to the photosensitive material magazine 14, a magazine 46 for receiving and storing the photosensitive material is disposed and therein where the image receiving material 48 is wound in the form of a roll to be stored.

The dimension of the image receiving material 48, as measured in the lateral direction, is smaller than the photosensitive material 16, and a pigment fixing material containing a mordant is applied to the surface on which the image is formed.

Also in the neighborhood of this magazine 46, a cutter 50 is disposed so that the image receiving material 48, which has been withdrawn from the magazine 46 may be cut to a length smaller than that of the photosensitive material 16. The cut image receiving material 48 is conveyed toward the thermal developing transfer portion 38. In this case, conveyance of the image receiving material 48 is synchronized with the conveyance of the photosensitive material 16 so that the photosensitive material 16 may extend over the former by a predetermined length.

The thermal developing transfer portion 38 is constituted by a heating drum 40 and an endless pressure-contact belt 42 as a pressure means, and a halogen lamp 44 is disposed within the heating drum 40.

On the surface of the heating drum 40, a teflon coating is applied and is heated to about 90° C. by means of the halogen lamp 44.

In addition, the endless pressure-contact belt 42 is coated with a silicone rubber containing carbon within a heat-resistant material, such as an aromatic polyamide fiber (for example, Kepler or Normex: each of these is a registered trademark of products commercially available from Du Pont Inc.) or the like, and is electrically conductive.

The photosensitive material 16, on which the image is exposed, is conveyed about approximately two-thirds of the circumference of the heating drum 40, sandwiched between the heating drum 40 and the endless pressure-contact belt 42 and superposed on the image receiving material 48. If the photosensitive material 16 is heated while being sandwiched and conveyed, it emits a mobile pigment and, at the same time, this pigment is transferred onto the pigment fixing layer of the image receiving material 48 to achieve a specific image.

In this case, since the endless pressure-contact belt 42 is electrically conductive, generation of static electricity, which is caused by the friction between the heating drum 40 and the endless pressure-contact belt 42, or the photosensitive material 16 or the image receiving material 48, is prevented.

A flexible guide roller 52 is disposed at the lower portion of the heating drum 40 at the downstream side as viewed in the direction in which the material is supplied by the endless pressure-contact belt 42. As for the flexible guide roller 52, its shaft 54 is coupled to a driving source (not shown), by whose driving force it is rotated. The flexible guide roller 52 press-contacts the outer circumference of the heating drum 40 so that it may convey the photosensitive material 16 and the image receiving material 48 by sandwiching them with the heating drum 40.

A peeling-off nail 58 is rotatably supported at the lower portion of the heating drum 40 downstream as viewed in the direction in which the material is supplied by the flexible guide roller 52, by means of a shaft 60, while a transfer roller 81, which is rockingly moved between a position where it abuts this flexible guide roller 52 and a position where it is spaced apart therefrom, is disposed so as to oppose the flexible guide roller 52.

Downwardly of the heating drum 40, a box 98 for storing the discarded photosensitive materials is disposed, into which the photosensitive material 16 separated by the peeling-off nail 58 is fed.

Meanwhile, in the neighborhood of the heating drum 40 and above the peeling-off nail 58, a peeling-off roller 100 and a peeling-off nail 102 are disposed so as to peel off the image receiving material 48, which is separated from the photosensitive material 16 and moves together with the heating drum 40, from the outer circumference of the heating drum 40. The image receiving material 48 which has been peeled off from the outer circumference of the heating drum 40 is collected onto a tray 104.

Next, the operation of this embodiment is hereinafter described.

If, after the photosensitive material 16 withdrawn from the magazine 14 is cut by the cutter 18, it is conveyed to the exposure portion 20, then the exposure apparatus 22 is actuated, and the image of the first or second copy 24 or 86 is scanned and exposed onto the photosensitive material 16 lying at the exposure portion 20. Incidentally, how the copy is selected will later be described.

The photosensitive material 16 after exposure is inverted and conveyed by means of the inversion roller 34, and after water as a solvent for forming the image is applied thereto by means of the water-applying portion 36, it is conveyed to the thermal developing transfer portion 38.

On the other hand, after the image receiving material 48 is withdrawn from the magazine 46 and cut to a predetermined length by means of the cutter 50, it is fed to the thermal developing transfer portion 38 and is superposed on the photosensitive material 16. In this case, conveyance of the image receiving material 48 is synchronized with the conveyance of the photosensitive material 16, and the photosensitive material 16 is superposed thereon.

At the thermal developing transfer portion 38, the photosensitive material 16 and the image receiving material 48 are fed in between the heating drum 40 and the endless pressure-contact belt 42, and pressed against the outer circumference of the heating drum 40, they are sandwiched and conveyed, while being superposed with each other.

When the photosensitive material 16 is pressed at the thermal developing transfer portion 38 (between the heating drum 40 and the endless pressure-contact belt 42) in a state in which it is pressed together with the image receiving material 48, it emits a mobile pigment, which is transferred onto the pigment fixing layer of the image receiving material 48 to achieve an image.

When the photosensitive material 16 and the image receiving material 48 reaches the lower portion of the heating drum 40, the peeling-off nail 58 engages the top end portion of the photosensitive material 16 to peel off the top end of the photosensitive material 16 from the outer circumference of the heating drum 40.

The photosensitive material 16, which is flexed downwardly by the transfer roller 81 and is wounded about the flexible guide roller 52, is conveyed, sandwiched by the flexible guide roller 52 and the transfer roller 81, and fed out into the box 98 for storing the discarded photosensitive materials.

In the meantime, the image receiving material 48, which is separated from the photosensitive material 16 and moves together with the heating drum 40, is fed to the peeling-off roller 100.

It is also peeled off here from the outer circumference of the heating drum 40 by means of the peeling-off roller 100 and the peeling-off nail 102 and is collected in the tray 104.

Next, how the selected documents (the first or second documents 24 or 86) are copied is hereinafter described.

Figure 2:
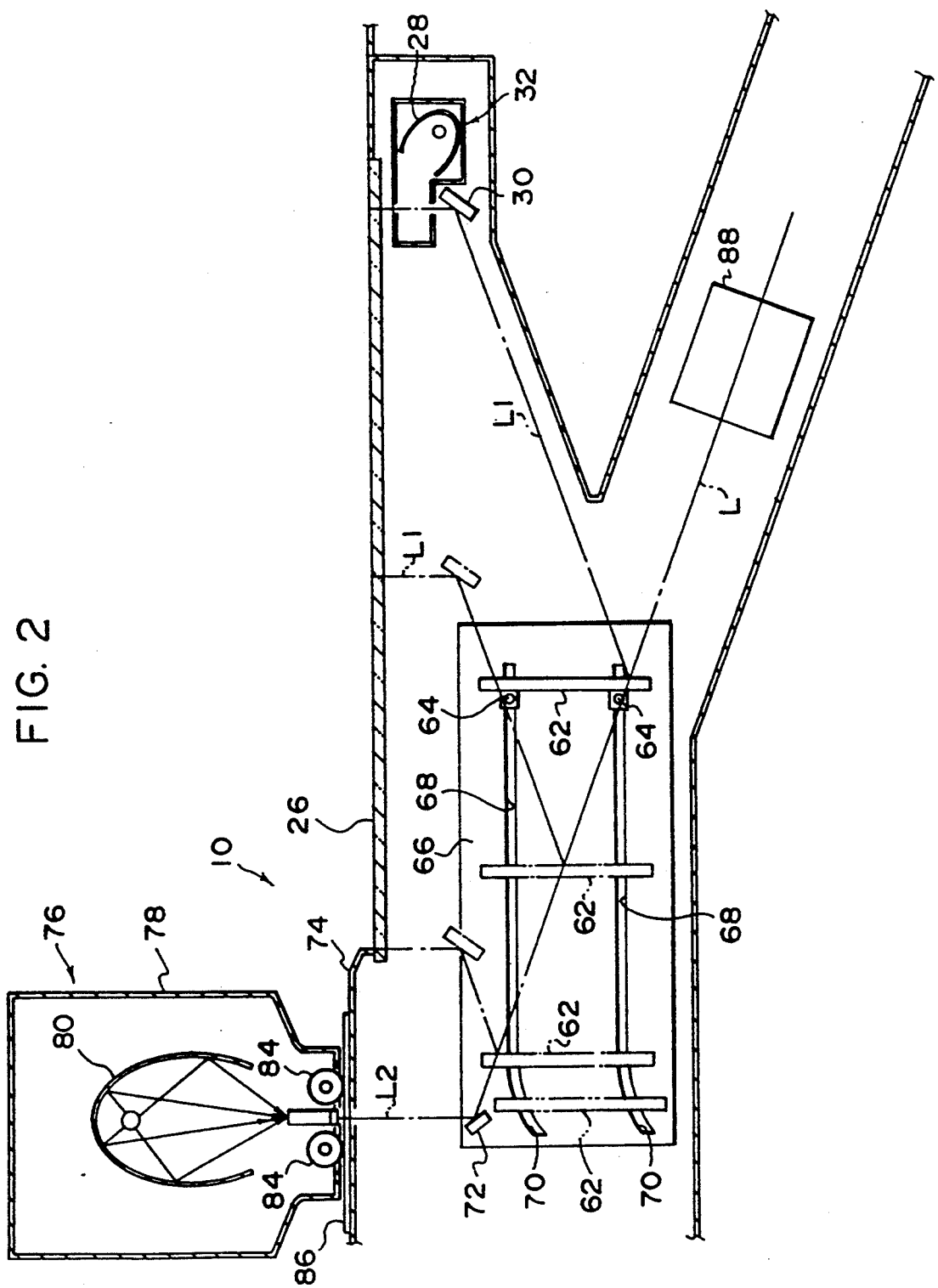
FIG. 2 is an enlarged view illustrating how a scanning mirror is disposed when a first document is copied.

If the first document 24 is placed on the document stand 26 and the image recorded on this first document 24 is copied in accordance with the above-described procedures, then the zoom lens 88 is shifted along the optical axis L with a set magnification (set to 100% according to the present invention). Next, after the light source is turned on, the first scanning unit 32 and the scanning mirror 62 begin to move from the left toward the right of FIG. 2 in synchronism with each other. As a result, the image of the first document 24 is scanned in a line and reaches the scanning mirror 62 via the mirror 30 along the optical path indicated by the optical axis L1. At this time, since the relative position between the first scanning unit 32 and the scanning mirror 62 is changed, the optical axis L reflected by the scanning mirror 62 will always coincide. Consequently, the light beams reflected against the scanning mirror 62 are reflected via the zoom lens 88 by the mirror 90 to reach the exposure portion 20.

Next, a case in which the second document 86 is copied is described.

Figure 3:
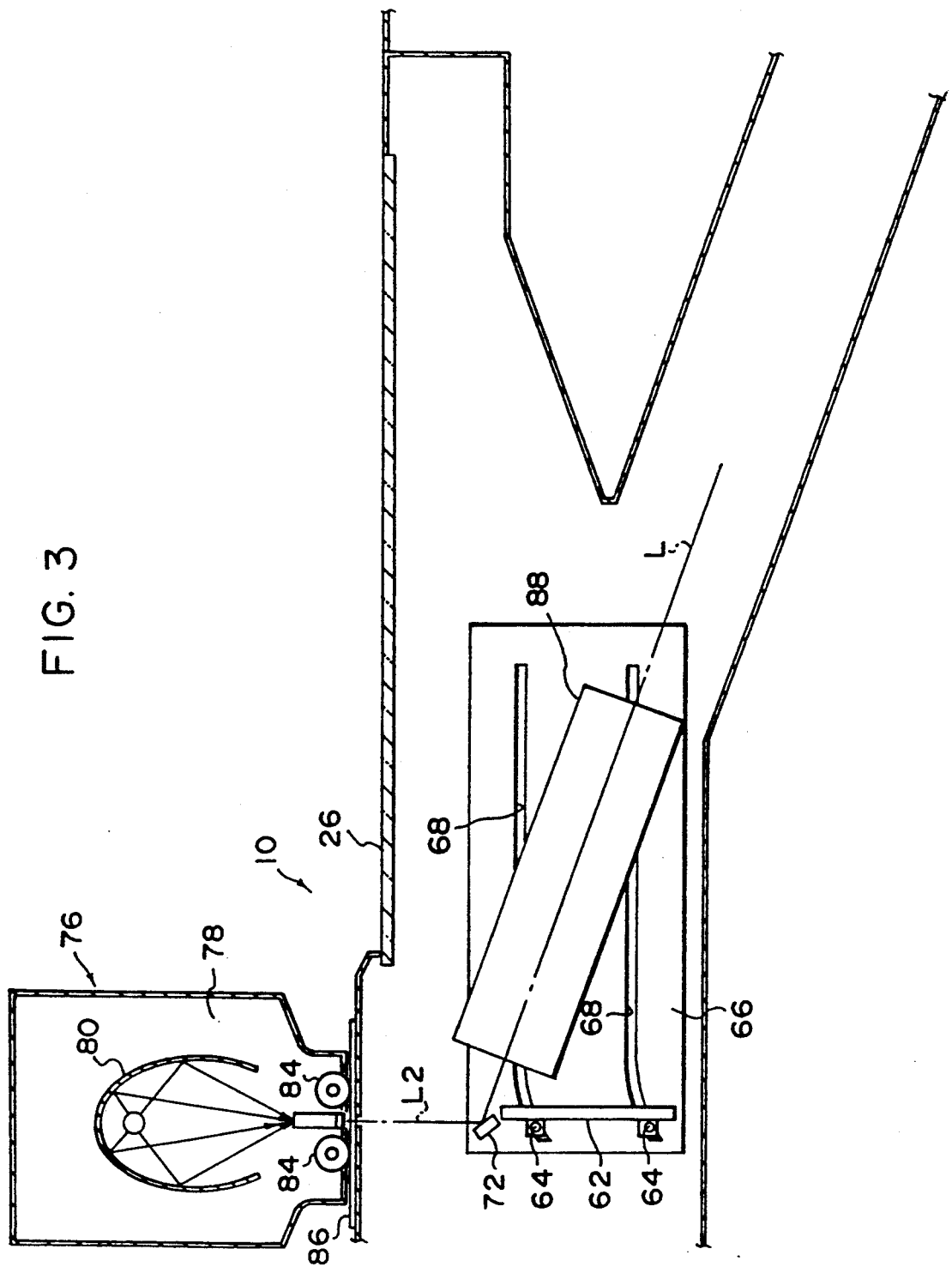
FIG. 3 is an enlarged view illustrating how a scanning mirror is disposed when a second document is copied.

When this second document 86 is copied, as shown in FIG. 3, the scanning mirror 62 lies at the home position, which is at the left end portion of the elongated holes 68 of the guide rail 66. Therefore, no obstacle is present between the optical axes L2 and L. If the second document 86 is specified, then the zoom lens 88 is shifted in the leftward direction of FIG. 3 along the optical axis L to reach the position of 400%.

Here, the light source 80 is turned on and the second document 86 is inserted into a space between the feeding rollers 84 and the base plate 74. As a result, by the driving of the feeding rollers 84, the second document 86 is shifted and the image, which has passed therethrough, is entered into the zoom lens 88 via the mirror 72, where it is enlarged and emitted therefrom. The emitted scanned image is reflected by the mirror 90 to reach the exposure portion 20.

As described above, since, by disposing the zoom lens 88 on the optical axis L, the zoom lens 88 can be also used for changing the magnification of the first document 24, and for increasing the high magnification of the second document 86, which requires high magnification, the lens system may be eliminated from the second scanning unit 76 and the number of parts can be reduced to make the entire apparatus small.

In addition, since the scanning mirror 62 is retracted to the home position where it does not interfere with the zoom lens 88, and the mirror 72 is disposed along the extension of the optical axis L, it is not necessary to use a half-mirror or the like. As a result, waste of the light can be eliminated. In addition, a special operation for this retraction is not necessary, but it may be retracted by only shifting the scanning mirror 62 along the elongated holes 68.

Figure 4:
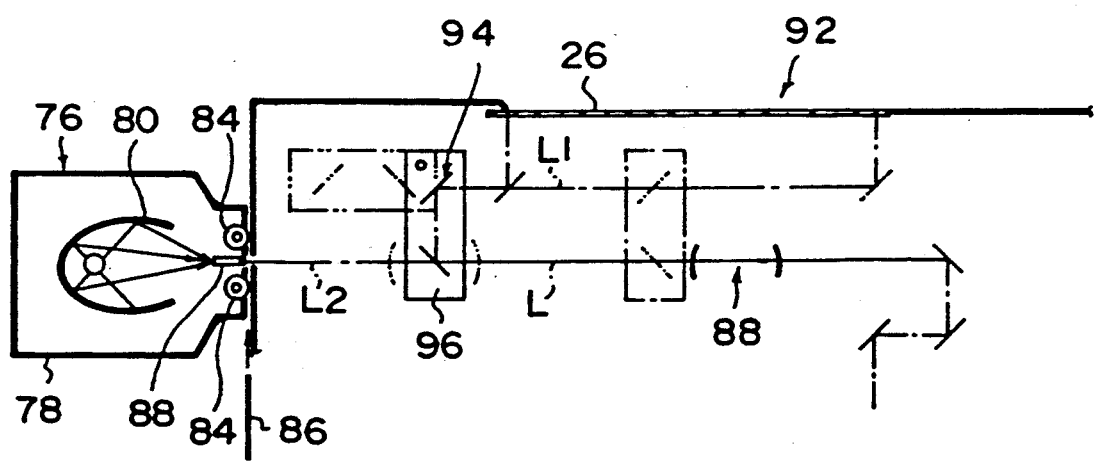
FIG. 4 is an enlarged view of an exposure portion according to a second embodiment in which the present invention is applied to a copying apparatus of another arrangement.

Incidentally, although, in this embodiment, the optical axis L of the exposure apparatus 22 is inclined relative to the document stand 26, the second scanning unit 76 may be disposed, as in the second embodiment shown in FIG. 4 on a lateral wall of the base 12 so that the zoom lens 88 may be disposed on the optical axis L running parallel to the document stand 26. That is, as shown in FIG. 4, a pair of mirrors 94 (so-called V mirrors), which is arranged to invert the optical path for the first scanning unit 32, is fixed to a bracket 96 so that their relative position is not changed. When the mirrors are located at the left end portion of FIG. 4, with part of the bracket 96 as their axis, they may be rotated by means of a motor (not shown) to retract from the optical axis L.

As a result, the scanned image can be guided from the optical axis L2 to the optical axis L.

As described above, the copying apparatus according to the above-described first and second embodiments eliminate a separate high magnification lens system, and make the scanning unit dedicated to high magnification small, so that the entire apparatus can be compact.

Figure 5:
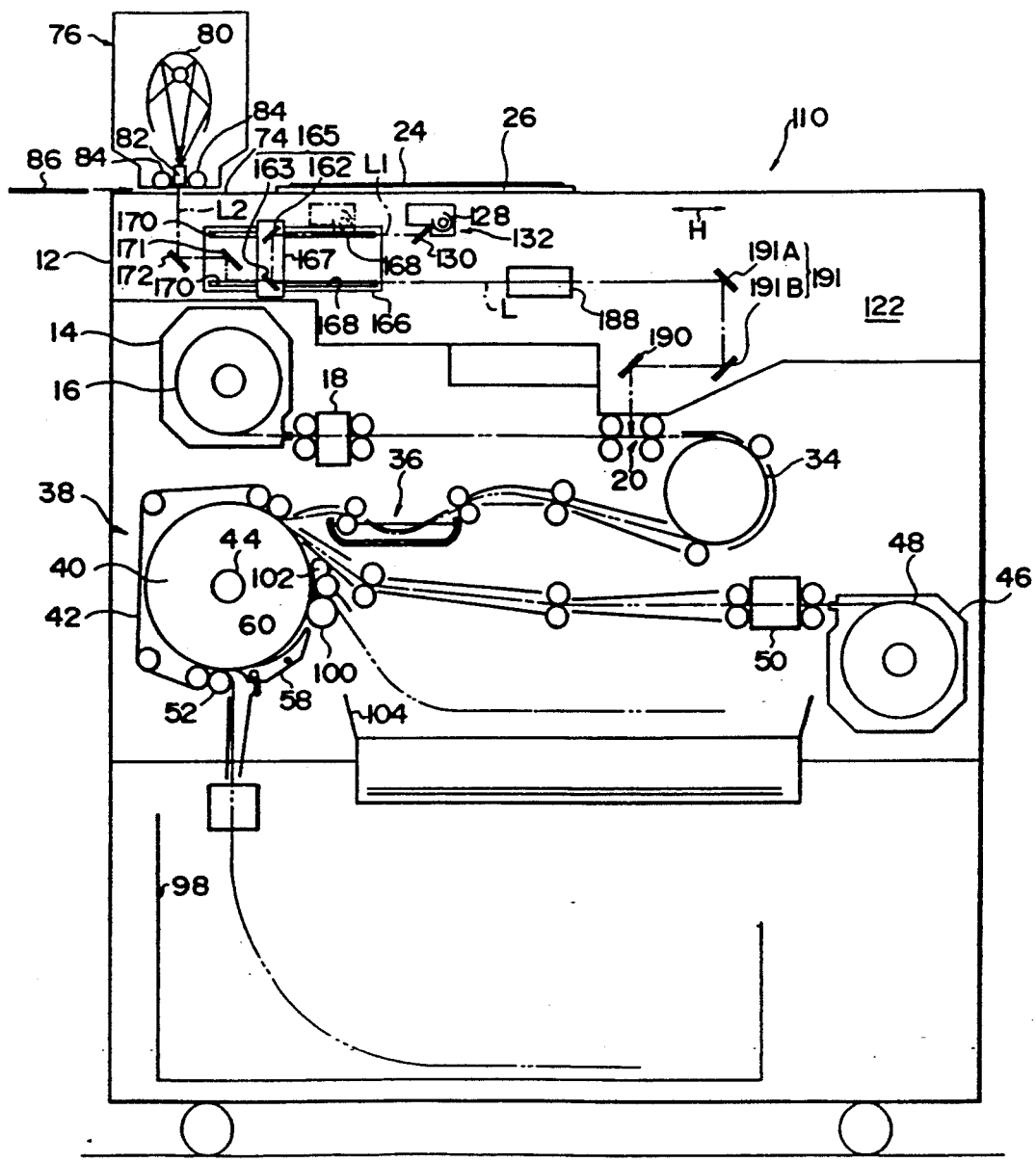
FIG. 5 is a schematic view of an arrangement of the copying apparatus according to a third embodiment.
Figure 6:
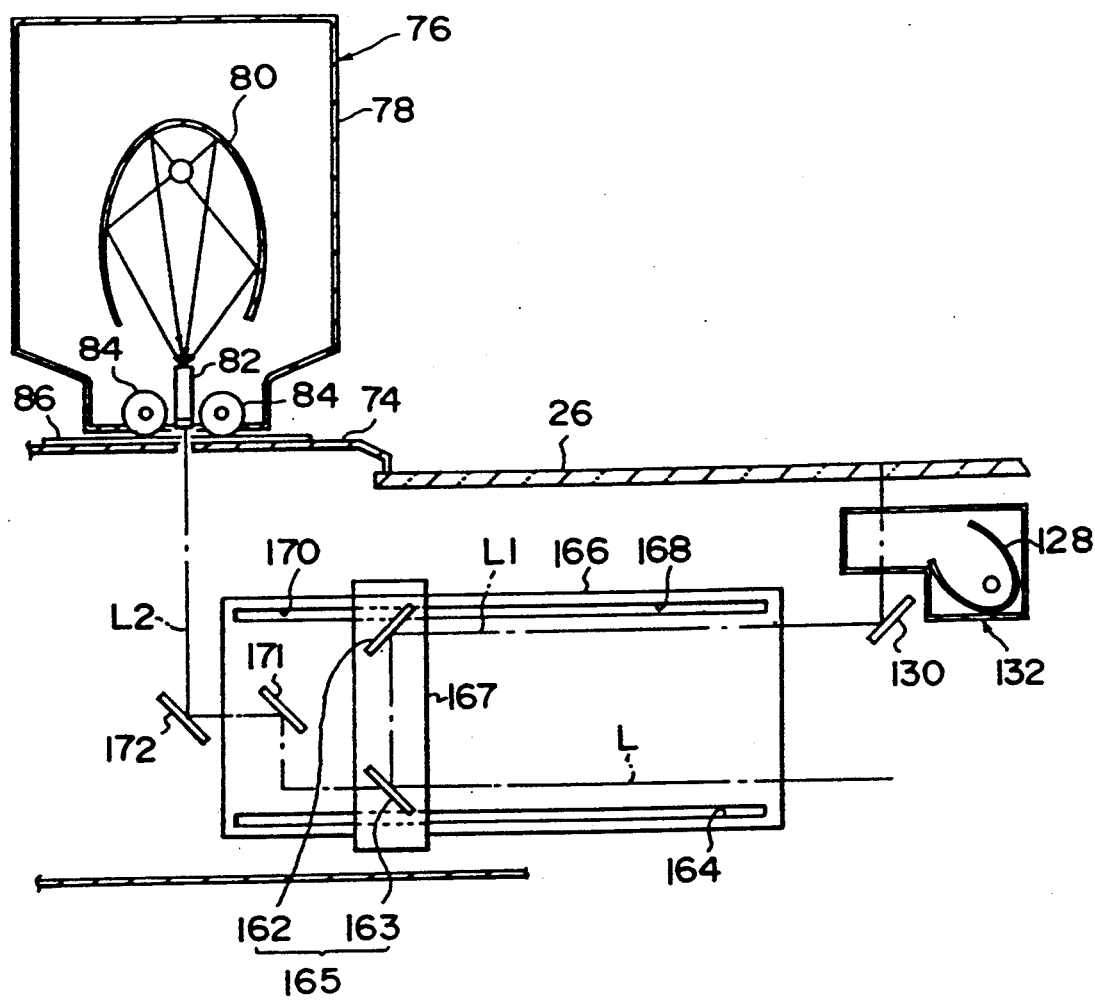
FIG. 6 is an enlarged view illustrating how the scanning mirror is disposed according to the third embodiment when the first document is copied.
Figure 7:
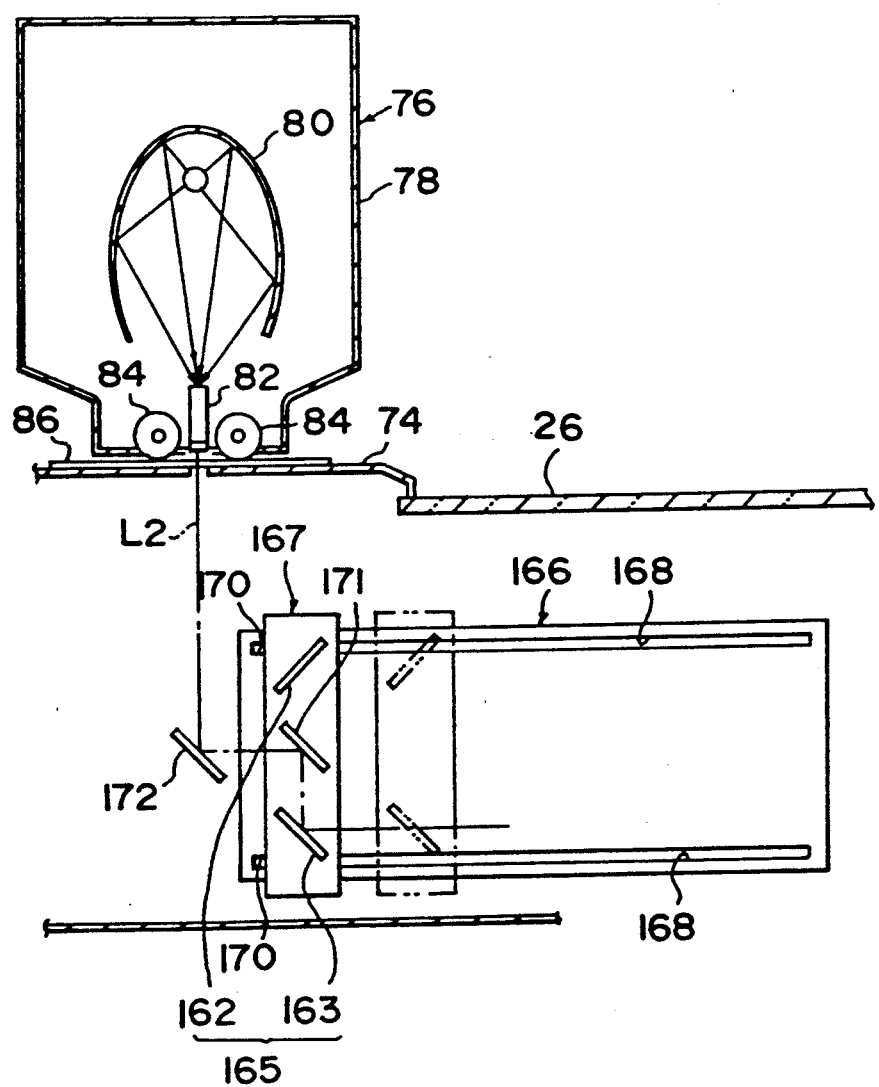
FIG. 7 is an enlarged view illustrating how the scanning mirror is disposed according to the third embodiment when the second document is copied.

Next, referring to FIGS. 5 through 7, a copying apparatus 110 according to a third embodiment is described.

Incidentally, in describing this embodiment, like arrangements, parts, members and the like similar to those of the first embodiment are assigned with the same reference numerals used in describing the first embodiment, and their detailed description is omitted.

Immediately above the exposure portion 20, an exposure apparatus 122 is provided. Above the exposure apparatus 122, the document stand 26 for placing the first document 24, which is made of a transparent glass plate, is disposed. The first document 24 may be of a standard size such as A4 or B4. Under the document stand 26, a first scanning unit 132 including a light source 128 and a mirror 130 which form parts of the first scanning means are disposed so that, by the driving of the driving portion (not shown), they may be reciprocally shifted in the leftward and rightward directions of FIG. 5 along the document stand 26. Incidentally, the position where the first scanning unit 132 stands by corresponds to a position indicated by an imaginary line at the left side of FIG. 5, and it is reciprocally shifted once along the document stand 26 to scan the image recorded on the first document 24 in a line.

The light beams from the light source 128 are illuminated onto the surface of the image recorded on the first document 24, and its reflected light reaches a pair of scanning mirrors 162 and 163 via the mirror 130, in which case the optical path indicated by the optical axis L1 forms the scanning optical path for the first scanning means.

For the scanning mirror 162 at the upstream side, the optical axis L1 is inclined so that the light beams may be entered at an incident angle of 45 degrees, and for the scanning mirror 163 at the downstream side, the optical axis of the light beams, which are reflected by the scanning mirror 162 at the upstream side, is inclined so that the light beams may be entered at an incident angle of 45 degrees, and the scanning mirror 163 may invert the optical axis L1. To this end, a substantially V shape is formed by the scanning mirrors 162 and 163 (the scanning mirrors 162 and 163 are hereinafter generally referred to as a V mirror 165). Incidentally, the inverted optical axis L of the optical path serves as an optical path common to the optical path of the optical axis L2 as the second document 86 is copied, which will be described later.

The V mirror 165 is mounted to a bracket 167 and is supported within elongated holes 168 formed on a guide rail 166 via pins (not shown). The elongated holes 168 are formed parallel to the document stand 26 so that the bracket 167 may be shifted along the document stand 26 by the driving portion (not shown). Here, the movements of the first scanning unit 132 and the bracket 167 are synchronized so that the length of the optical path remains constant during the scanning.

The left side portions of the elongated holes 168 of the guide rail 166 are formed longer than the scanning range for the first scanning unit 132 to form extensions 170.

Here, for the V mirror 165, the end portion of the scanning range which lies immediately before the extensions 170 is set as the home position therefor (the position indicated by solid lines of FIGS. 5 and 6), which is the position where it stands by at the time when copying is initiated.

With the V mirror 165 disposed at the end portions of the above-described extensions 170 (see solid line in FIG. 7), a switching mirror 171 is fixedly disposed between the scanning mirrors 162 and 163. The reflecting surface of the switching mirror 171 is opposed to the scanning mirror 163 while being disposed parallel to this scanning mirror 163. As a result, when the V mirror 165 lies at the end portions of the extensions 170, the light beams reflected by the scanning mirror 162 are blocked from entering into the scanning mirror 163 by the rear surface of the switching mirror 171.

The light beams from a mirror 172 may be entered into the switching mirror 171 at an incident angle of 45 degrees. This mirror 172 forms part of the second scanning means and serves to align the optical axis L2 of the optical beams from the second scanning unit 76, which is disposed on the base plate 74 (at the left side of FIG. 5) of the document stand 26, with the above-described optical axis L.

As shown in FIGS. 6 and 7, the second scanning unit 76 is the same as that of the first embodiment, and the light beams illuminated from the light source 80 are emitted to the above-described mirror 172 from the lower portion of the casing 78 via the mirror box 82. Furthermore, to the casing 78, a pair of feeding rollers 84 is mounted with the mirror box 82 interposed therebetween. That is, as in the first embodiment, if the second document 86 is placed on the base plate 74 and its one side is inserted into the space, then it is conveyed from the left to the right of FIG. 5, sandwiched by the feeding rollers 84 and the base plate 74. During this conveying, the light beams emitted from the mirror box 82 pass through the film surface and the scanned image reaches the mirror 172.

Here, when the V mirror 165 lies at the end portion of the extension 170, the light reflected by this mirror 172 is entered into the scanning mirror 163.

On the optical axis L, a focal point fixed lens 188 as in the first embodiment is disposed to change the magnification. This lens 188 may reduce or enlarge the scanned image passing through this optical axis L to 25% through 400% by moving along the optical axis L. Incidentally, the maximum magnification of the first document is 200% and that of the second document is 400%.

For example, when the document is reduced to 50%, the focal point fixed lens 188 is shifted in the rightward direction of FIG. 5, and when it is enlarged to 200%, it is shifted in the leftward direction of FIG. 5. Here, although the position of the lens 188 as the document is enlarged to 200% and the rightmost position of the V mirror 165 are the same, when it is enlarged to 200%, since only the half image area for the front portion of the document stand can be scanned, the scanning mirror 162 does not reach this rightmost position so that the lens 188, and the V mirror 165 do not interfere with each other.

The light beams emitted from the lens 188, that is, the scanned image, are reflected by a V mirror 191 (a mirror 191A and a mirror 191B), of the same arrangement as that of the above-described V mirror 165, and a mirror 190 to reach the above-described exposure portion 20. This V mirror 191 is set for adjusting the focal length as the magnification is changed by the lens 188 so that it may be slightly shifted in the leftward and rightward directions of FIG. 5 (see a shifting range indicated by an arrow H of FIG. 5).

Other arrangements of this embodiment are similar to those of the first embodiment, and their description is omitted.

Next, the operation of this embodiment is described.

Since the operation of the entire copying apparatus is similar to that of the first embodiment, how the selected document (the first document 24 or the second document 86) is copied is described.

When the first document 24 is placed on the document stand 26 and the image recorded thereon is copied in accordance with the above-described procedure, first, the focal point fixed lens 188 is shifted along the optical axis L with a preset magnification (set to 100% according to this embodiment) to actuate the V mirror 191 to align the focal point. Next, after the light source 128 is turned on, the first scanning unit 132 and the scanning mirror 162 begin to shift from the left to the right of FIG. 6 in synchronism with each other. As a result, the image of the first document 24 is scanned in a line and reaches the V mirror 165 via the mirror 130 along the optical path indicated by the optical axis L1. At this time, since the relative position between the first scanning unit 132 and the V mirror 165 is changed, the sum of the lengths of the optical mirror 165 is changed, the sum of the lengths of the optical axes L1 and L will remain constant. Therefore, the light beams reflected by the scanning mirror 162 are reflected by the mirror 190 via the lens 188 and the V mirror 191 to reach the exposure portion 20.

Next, a case in which the second document 86 is copied is described. When this second document 86 is copied, the scanning mirror 162, as shown in FIG. 7, is further shifted from the home position, which lies at the end portion of the scanning range of the elongated holes 168 of the guide rail 166, to the end portions of the extensions 170. Thus the switching mirror 171 is disposed between the scanning mirrors 162 and 163. If the second document 86 is specified, then the focal point fixed lens 188 is shifted to the left of FIG. 7 along the optical axis L to reach the position of 400%. Here, the light source 80 is turned on and the second document 86 is inserted into the space between the feeding rollers 84 and the base plate 74. As a result, by the driving of the feeding rollers 84, the second document 86 is shifted, and the image which passed through is entered into the switching mirror 171 via the mirror 172 to be entered into the focal point lens 188 via the scanning mirror 163. The image is enlarged by this lens 188 and is emitted. The emitted scanned image is reflected by the V mirror 191 and the mirror 190 to reach the exposure portion 20.

In this manner, since the switching mirror 171 may be disposed between the scanning mirrors 162 and 163 by only shifting the scanning mirror 162 from the home position to the end portion of the extension 170, it is not necessary to use a half-mirror or the like. As a result, waste of light can be eliminated. In addition, since this switching mirror may be shifted to exceed the normal scanning range, any special operation for shifting the same is not necessary, and it is sufficient to only shift the scanning mirror 162 along the elongated holes 168, which may simplify the arrangement of the apparatus.

Figure 8:
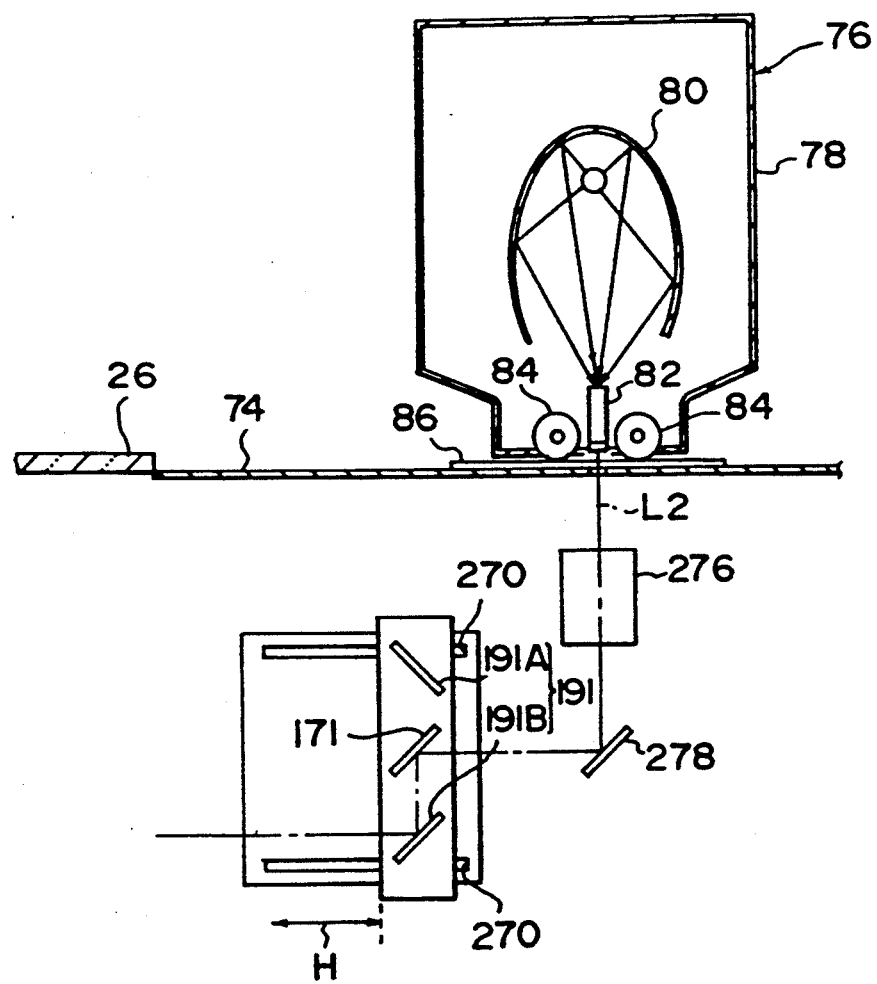
FIG. 8 is an enlarged view of an exposure portion according to a fourth embodiment in which the present invention is applied to a copying apparatus of an other arrangement.

Next, a fourth embodiment is described with reference to FIG. 8. Incidentally, like numerals are assigned to the same portions as those of the third embodiment and their description is omitted.

A feature of this embodiment lies in the fact that the V mirror 191 may be shifted so that the switching mirror 171 is disposed between the mirrors 191A and 191B, which form the V mirror 191 at the downstream side.

That is, this V mirror 191 may be slightly shifted, as indicated by the arrow H of FIG. 5, in order to adjust the focal length. The extensions 270 are provided at the right end portion of this shifting range H of FIG. 5 so that, when the V mirror 191 is shifted to the end portions of this extensions 270, the switching mirror 171 may be disposed between the mirrors 191A and 191B. On the other hand, the second scanning unit 76 is disposed on the base plate 74 of the document stand 26 at the right side of FIG. 5 so that the light beams of the image of the second document 86, which passed through, may reach the switching mirror 171 via the magnification increasing lens 276 and the mirror 278.

According to this arrangement, as in the third embodiment, no special switching mechanism is necessary and, by only increasing the shifting range of the V mirror 191, the first and second documents 24 and 86 can be selected for copying.

Figure 9:
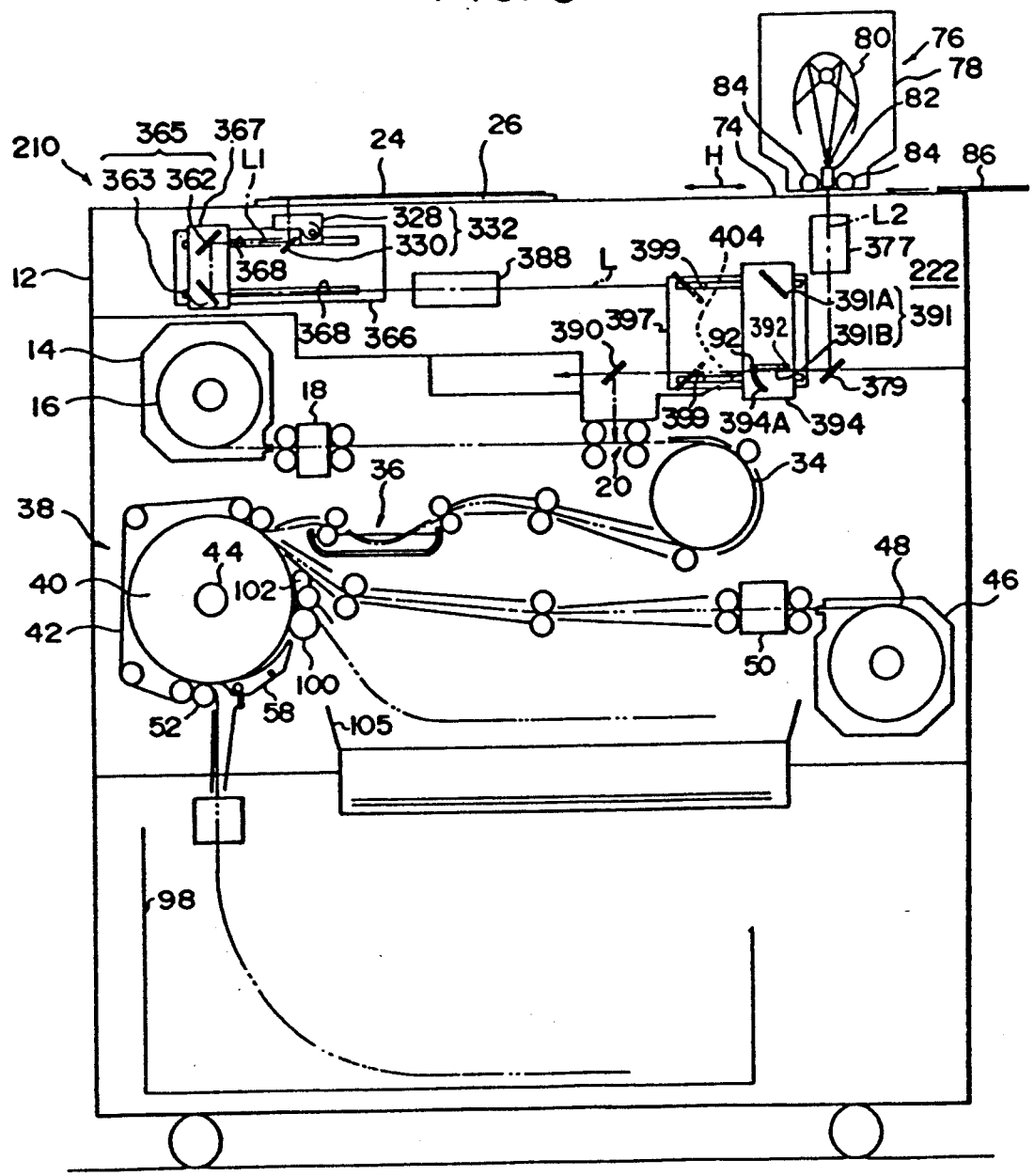
FIG. 9 is a schematic view of an arrangement of the copying apparatus according to a fifth embodiment.

Next, the copying apparatus according to a fifth embodiment illustrated in FIG. 9, is described.

In this embodiment, since an exposure apparatus 222 differs from those of the first and second embodiments, it is mainly described.

In describing this embodiment, like arrangements, members, parts and the like similar to those of the first and third embodiments are assigned with the same reference numerals as those for those embodiments, and their detailed description is omitted.

Immediately above the exposure portion 20, the exposure apparatus 222 is provided. Under the document stand 26 of the exposure apparatus 222, a first scanning unit 332 including a light source 328 and a mirror 330 which forms part of the first scanning means is disposed and, by the driving of the driving portion (not shown), they may be reciprocally shifted in the leftward and rightward directions of FIG. 9 along the document stand 26. Incidentally, the position where the first scanning unit 332 stands by corresponds to the left side of FIG. 9, from which it is reciprocally shifted once along the document stand 26 to scan the image recorded on the first document 24 in a line.

The light beams from the light source 328 are illuminated onto the image surface recorded on the first document 24, and the reflected image reaches a pair of scanning mirrors 362 and 363 via the mirror 330. At this time, the optical path shown by the optical axis L1 in FIG. 9 forms a scanning optical path by the first scanning means.

The optical axis L1 of the upstream scanning mirror 362 is inclined so that the light beams may be entered therein at an incident angle of 45 degrees, and the downstream scanning mirror 363 is inclined so that the optical axis of the light beams, which are reflected by the upstream scanning mirror 362, may be entered therein and invert the optical axis L1. As a result, the scanning mirrors 362 and 363 form a substantially V-shape (the scanning mirrors 362 and 363 are hereinafter generally referred to as a V mirror 365). Incidentally, part of the inverted optical axis L of the optical path is common to the optical path of the optical axis L2 as the second document 86 is copied, which will be described later.

The V mirror 365 is fixedly attached to the bracket 367, this bracket being supported against the elongated holes 368 formed on the guide rail 366 via the pins (not shown). The elongated holes 368 are formed parallel to the document stand 26, and therefore, the bracket 367 may be shifted along the copy stand by the driving of the driving portion (not shown).

Here, the movements of the first scanning unit 332 and the bracket 367 are synchronized so that the lengths of the optical paths of the light beams, which are reflected by the scanning mirror 362, remain constant.

On the optical axis L, a focal point fixed lens 388 is disposed for changing the magnification. This lens 388 may reduce or enlarge the scanned image, which passes through this optical axis L, to 25% through 400% by moving along the optical axis L. Incidentally, the maximum magnification for the first copy is 200% and that for the second document is 400%.

For example, when the image is reduced to 50%, the lens 388 is shifted in the rightward direction of FIG. 9, and when it is enlarged to 200%, the lens 388 is shifted in the leftward direction of FIG. 9. Here, although, the position of the lens as the image is enlarged to 200% and the rightmost position of the V mirror 365 are the same, if the image is enlarged to 200%, since the image can be scanned over only the image area for the front portion of the document stand 26, the scanning mirror 362 cannot reach this rightmost position, and the lens 388 and the V mirror 365 do not interfere with each other.

The light beams emitted from the focal point fixed lens 388, that is, the scanned image, are reflected by a V mirror 391 (the mirror 391A and the mirror 319B), of the same arrangement as that of the V mirror 365, and a mirror 390 to reach the above-described exposure portion 20. This V mirror 391 is set for adjusting the focal point as the magnification by the lens 388 is changed, and a pair of scanning mirrors 391A and 391B is each mounted to a bracket 394. Here, a shaft 92 of the end portion of the scanning mirror 391B is accommodated within an arcuate elongated hole 394A formed on the bracket 394 so that the scanning mirror 391B may be rotated with the shaft 392 at its upper end portion as its axis.

The bracket 394 is accommodated within the elongated holes 399 formed on a guide rail 397 via the pins (not shown). The longitudinal direction of the elongated holes 399 runs in the leftward and rightward directions of FIG. 9 and, by means of a driving means (not shown), the bracket 394 may be slightly shifted in the leftward and rightward directions of FIG. 9 (see a shifting range indicated by arrow H of FIG. 9).

Corresponding to the right end portion of this shifting range H of FIG. 9, a stepped portion 404 is formed at the lower end portion of the guide rail 397. The stepped portion 404 is present on the shift locus of the scanning mirror 391B with the result that, if the bracket 394 is shifted up to the right end portion of FIG. 9 to exceed the normal shifting range H, then the scanning mirror 391B and the stepped portion 404 abut so that the scanning mirror 391B may be rotated with the shaft 392 as its axis to achieve its horizontal condition.

On the other hand, the second scanning unit 76 is disposed on the base plate 74 at the right side of the document stand 26, as viewed in FIG. 9, and the light beams of the image of the second document 86, which passed through, may coincide with the downstream scanning optical path of the scanning mirror 391B via a magnification enlarging lens 377 and a mirror 379.

That is, when the bracket 394 lies within the normal shifting range, the light beams from the second scanning unit are interrupted by the scanning mirror 391B, but if the bracket 394 reaches the right end portion of FIG. 9 exceeding the normal shifting range, then, since the scanning mirror 391B is excluded from above the scanning optical path from the second scanning unit 76 (horizontal condition), these light beams may be guided toward the downstream side of the scanning mirror 391B.

The second scanning unit 76 is the same as that of the first embodiment, and the light beams illuminated from the light source 80 may be emitted to the above-described lens 377 and the mirror 379 from the lower portion of the casing via the mirror box 82. In consequence, when the second document 86 is placed on the base plate 74 and its one side is inserted into the above-described space, it is conveyed from the left to the right of FIG. 9 sandwiched by the feeding rollers 84 and the base plate 74. During this conveying, the light beams emitted from the mirror box 82 may pass through the film surface so that the scanned image reaches the mirror 379.

Other arrangements are similar to those of the first and third embodiments, and their descriptions are omitted.

Next, the operation of this embodiment is described.

The overall operation of the copying apparatus according to the present invention is the same as that of the first and third embodiments, and therefore, how the selected copy (the first document 24 or the second document 86) is copied according to the present invention is hereinafter described.

Figure 10:
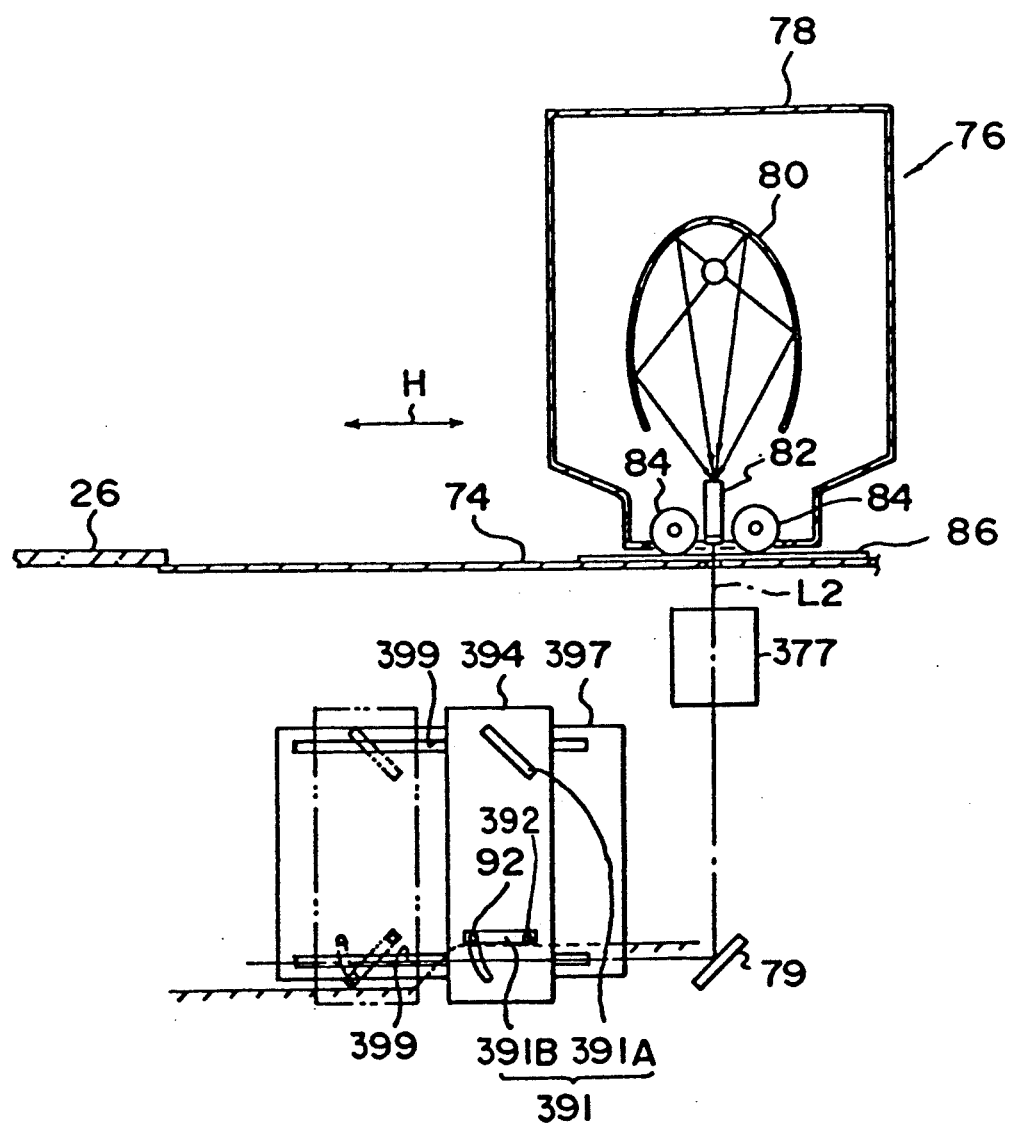
FIG. 10 is an enlarged view illustrating how the scanning mirror is disposed when the first document is copied according to the fifth embodiment.

When the first document 24 is placed on the document stand 26 and the image recorded thereon is copied, first, the focal point fixed lens 388 is shifted along the optical axis L with a set magnification (set to 100% according to this embodiment). Next, after the light source 328 is turned on, the first scanning unit 332 and the scanning mirror 362 begin to move from the left to the right of FIG. 10 in synchronism with each other. Thus the image of the first document 24 is scanned in a line and reaches the V mirror 365 via the mirror 330 along the optical path shown by the optical axis L1. At this time, because the relative position between the first scanning unit 332 and the V mirror 362 is changed, the sum of lengths of the optical paths for the optical axes L1 and L will always coincide. As a result, the light beams reflected by the scanning mirror 362 are reflected by the mirror 390 via the focal point fixed lens 388 and the V mirror 391 to reach the exposure portion 20.

Next, a case in which the second document 86 is copied is hereinafter described.

When this second document 86 is copied, the bracket 394 to which the V mirror 391 is mounted is shifted to the right end portion of FIG. 9 beyond the normal shifting range. Consequently, the scanning mirror 391B abuts the stepped portion 404, thereby the scanning mirror 391B is rotated with the shaft 392 at its upper side portion as its axis to achieve its horizontal condition. When the second document 86 is specified, the light source 80 is turned on and the second document 86 is inserted into the space between the feeding rollers 84 and the base plate 74. Thus, by the driving of the feeding rollers 84, the second document 86 is shifted, and the light beams of the image which passed through are reflected by the lens 377 and the mirror 379. At this time, since the scanning mirror 391B maintains a horizontal condition, these light beams coincide with the optical path downwardly of the scanning mirror 391B, and are reflected by the mirror 390 to reach the exposure portion 20.

In this manner, since the light beams of the image of the second document which passed through can be guided into the exposure portion 20 by only turning the scanning mirror 391B into the horizontal condition by moving the bracket 394 to exceed the normal shifting range, it is not necessary to use a half-mirror or the like. As a result, waste of light can be eliminated.

Figure 11:
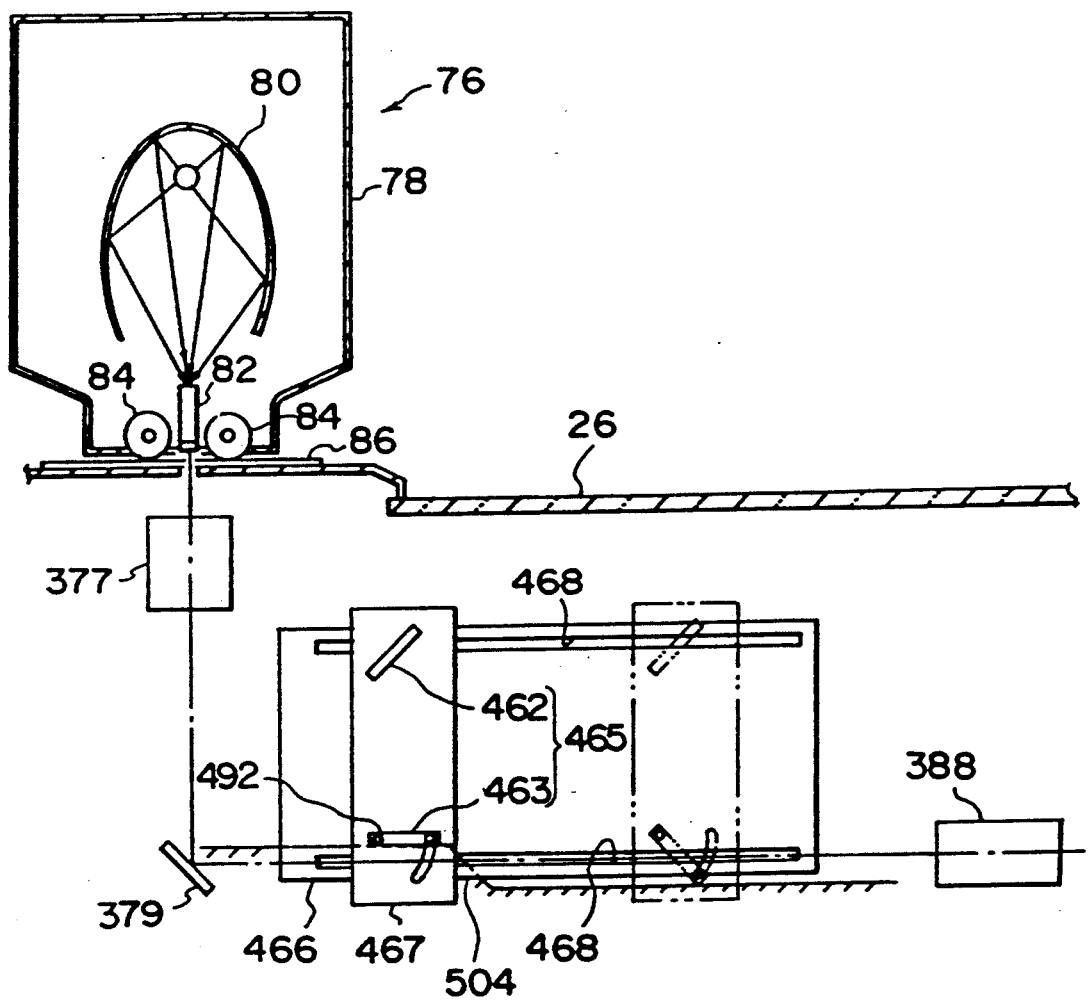
FIG. 11 is an enlarged view of an exposure portion according to a sixth embodiment in which the present invention is applied to a copying apparatus of an other arrangement.

Incidentally, although, in this embodiment, the bracket 394, to which the V mirror 391 is mounted, is moved so that it exceeds the normal shifting range to turn the scanning mirror 391B into its horizontal condition so that, when the second document 86 is copied, the path of the light reflected from the mirror 379 into the mirror 390 may not be interrupted, it may be also arranged as a sixth embodiment shown in FIG. 11.

In this embodiment, the second scanning unit 76, lens 377 and the mirror 379 are disposed at the left side of the document stand of FIG. 9. In place of the guide rail 366, a guide rail 466 which has an elongated holes 468 longer than the elongated holes 68 and has substantially the same shape of the guide rail 397 is used.

That is, in this guide rail 466, a stepped portion 504 is formed. In addition, the bracket 367 to which the V mirror 365 is mounted is replaced by a bracket 467 similar to the bracket 394, to which the V mirror 391 is mounted. That is, the bracket 467 has a V mirror 465, which is provided with a scanning mirror 462 fixedly disposed on the bracket 467 and a scanning mirror 463, which is rotatable with a shaft 492 as its axis, in a manner similar to that of the scanning mirror 391B. Incidentally, the light which passes through the focal point fixed lens 388 is reflected by a V lens (not shown), fixedly disposed at the position where the V mirror 391 of the fifth embodiment is disposed, to be entered into the mirror 390 shown in FIG. 9. Therefore, when the second document 86 is copied, by shifting the bracket 467 toward the left side of FIG. 9 further than when the first document 24 is exposed, the scanning mirror 463 is turned into its horizontal condition as it is rotated scanning mirror 463 via the stepped portion 504. As a result, the scanning mirror 463 is retracted from the optical path of the light reflected by the mirror 379 and, as in the fifth embodiment, this reflected light is entered into the exposure portion 20 via the mirror 390. In this case, if a zoom lens is used for this focal point fixed lens 388, it may be utilized for changing the normal magnification (25% through 200%) and the high magnification (400%), in which case the lens 377 may be eliminated.

As described above, the copying apparatuses according to the above-described third through sixth embodiments each has an excellent advantage in that any loss of light is eliminated, and without any special switching mechanism, the light beams from two optical paths may be switched to be guided onto the photosensitive material for copying the image.

What is claimed is:

1. A copying apparatus comprising:
   first scanning means having scanning mirror means shiftable over a predetermined range to scan an image recorded on a first document which is disposed at a predetermined position and to expose a photosensitive material;
   second scanning means for shifting a second document which requires high magnification, to scan an image recorded thereon and to expose a photosensitive material; and
   a zoom lens, for changing a magnification, disposed on a common optical path set downstream of said scanning mirror means, a scanning path for said first scanning means and a scanning path for said second scanning means coinciding with each other.

2. A copying apparatus according to claim 1 further comprising, retracting means for retracting said scanning mirror means so that, when an image recorded on said second document is copied, light from said second scanning means passes through said common optical path.

3. A copying apparatus according to claim 2 wherein said retracting means is arranged so that it retracts said scanning mirror means by shifting said scanning mirror means beyond said predetermined range.

4. A copying apparatus according to claim 2 wherein the shifting of said scanning mirror means in excess of said predetermined range is carried out in an arcuate manner so as to simultaneously retract said scanning mirror means.

5. A copying apparatus according to claim 2 wherein said retracting means is arranged so that it retracts said scanning mirror means by rotating said scanning mirror means.

6. A copying apparatus according to claim 1 wherein said second scanning means is disposed along an extension of said common optical path so that scanning light therefrom is rectilinearly entered into said common optical path.

7. A copying apparatus according to claim 1 wherein said scanning mirror means comprises a first mirror for receiving and reflecting the light reflected by said first document, a second mirror for receiving the light reflected by said first mirror to enter it into said common optical path, and a shifting means for shifting said first and second mirrors beyond said predetermined range, and said second scanning means comprises a third mirror for entering scanning light thereof into said common optical path via said second mirror, when said second mirror has been shifted to exceed said predetermined range.

8. A copying apparatus comprising:
   first scanning means having scanning mirror means for scanning an image recorded on a first document disposed at a predetermined position and guide means for guiding said scanning mirror means so that it is shifted along said first document so that, by shifting said scanning mirror means over a predetermined range along said guide means, it scans the image recorded in an said first document;

a zoom lens, for changing a magnification, disposed in an optical path of the light reflected by said first scanning means;

second scanning means disposed so as to enter scanning light thereof into said optical path of the light reflected by said scanning mirror means, for scanning an image recorded on a second document, which requires a high magnification; and e retracting means for retracting said scanning mirror means so that, when the second document is scanned by said scanning means, the scanning light from said second scanning means enters into said zoom lens.

9. A copying apparatus according to claim 8 wherein said retracting means is coupled with said guide means, which is arranged so that it allows the scanning mirror means to shift from a position where the scanning light from said second scanning means is blocked from entry into said zoom lens to a position where scanning light from said scanning means is allowed to enter said zoom lens by means of a shift of said scanning mirror means in excess of said predetermined range.

10. A copying apparatus according to claim 8 wherein said retracting means is arranged so that it may retract said scanning mirror means by rotating it from the position where scanning light from said second scanning light is blocked from entry into said zoom lens to a position where entrance of light is allowed.

11. A copying apparatus comprising:
first scanning means for being shifted along a first document disposed at a predetermined position to scan an image recorded thereon;

scanning mirror means, having a first scanning mirror for receiving and reflecting the scanning light from said first scanning means, and a second scanning mirror for reflecting the light reflected from said first scanning mirror, said scanning mirror means integrally shifting said first and second scanning mirrors over a predetermined range to expose a photosensitive material by the light reflected by said second scanning mirror;

second scanning means for shifting a second document, which requires a high magnification, to scan an image recorded thereon;

movement allowing means for allowing said first and second scanning mirrors to be shifted in excess of said predetermined range; and a switching mirror disposed so that, when said first and second scanning mirrors are shifted in excess of said predetermined range via said movement allowing means, said switching mirror lies between said first and second scanning mirrors to direct the scanning light for said second scanning means into said second scanning mirror, to expose the photosensitive material, so that it coincides with the optical axis of the light reflected by said second scanning mirror when said first document is scanned.

12. A copying apparatus according to claim 11 wherein said first and second scanning mirrors are each arranged so that, as said first document is scanned, the optical axis along which the scanning light of said first document is entered into said first scanning mirror, and the optical axis of the light reflected by said second scanning mirror are inverted by 180 degrees.

13. A copying apparatus according to claim 12 wherein said first scanning mirror is disposed so that, as said first document is scanned, the incident angle of said scanning light is 45 degrees, and said second scanning mirror is disposed so that, as said first copy is scanned, the incident angle of the scanning light from said first scanning mirror is 45 degrees.

14. A copying apparatus comprising:
first scanning means for being shifted along a first document disposed at a predetermined position to scan an image recorded thereon;

scanning mirror means having a first scanning mirror for receiving and reflecting the scanning light from said first scanning means and a second scanning mirror for reflecting the light reflected by said first scanning mirror means, said scanning mirror means being shifted between a first position and a second position to expose a photosensitive material by said light reflected by said first scanning means;

a second scanning means for shifting a second document, which requires a high magnification, to scan an image recorded thereon; and a switching mirror which is positioned so that when said scanning mirror means is shifted to said second position, the scanning light of said second scanning means is directed thereby into said second scanning mirror so as to cause the light reflected by said second scanning mirror at the time of scanning said second document to pass through the optical axis coinciding with the optical axis of the light reflected by said second scanning mirror at the time of scanning said first document, thereby exposing the photosensitive material.

15. A copying apparatus according to claim 14 wherein said first and second scanning mirrors are each disposed so that the optical axis of the scanning light of said first document, which is entered into said first scanning mirror as said first document is scanned, and the optical axis of the light reflected by said second scanning mirror are inverted by 180 degrees.

16. A copying apparatus according to claim 15 wherein said first scanning mirror is disposed so that the incident angle of said scanning light is 45 degrees as said first document is scanned, and said second scanning mirror is disposed so that the incident angle of the scanning light from said first scanning mirror is 45 degrees as said first document is scanned.

17. A copying apparatus comprising:
first scanning means for being shifted along a first document disposed at a predetermined position to scan an image recorded thereon;

second scanning means for shifting a second document, which requires a high magnification, to scan an image recorded thereon;

scanning mirror means having a first mirror for reflecting the scanning light for said first scanning means and a second mirror for reflecting the light reflected by said first mirror said scanning mirror means being shiftable between a first position and a second position so that said second mirror reflects the scanning light from said first scanning means, which is entered via said first scanning mirror, to expose a photosensitive material; and retracting means for retracting said second scanning mirror to allow the photosensitive material to be exposed by the scanning light of said second scanning means so that, when said scanning mirror means is shifted from said first position to said second position, the scanning light from said scanning means coincides with the optical path of the scanning light from said first scanning means, which is reflected by said second scanning mirror.

18. A copying apparatus according to claim 17 wherein said first and second scanning mirrors are each disposed so that the optical axis of the scanning light of said first document, which is entered into said first scanning mirror as said first document is scanned, and the optical axis of the light reflected by said second scanning mirror are inverted by 180 degrees.

19. A copying apparatus according to claim 18 wherein said first scanning mirror is disposed so that the incident angle of said scanning light as said first copy is scanned is 45 degrees, and said second scanning mirror is disposed so that the incident angle of the scanning light from said first scanning mirror as said first copy is scanned is 45 degrees.

20. A copying apparatus according to claim 17 wherein said second mirror is arranged so that, when shifted from said first predetermined position to said second predetermined position, it is retracted by being rotated.

21. A copying apparatus according to claim 20 further comprising: movement allowing means comprising a stepped portion, said second mirror being arranged so that, when shifted from said first predetermined position to said second predetermined position, it is pressed by said stepped portion and rotated.

22. A copying apparatus comprising:
first scanning means for being shifted along a first document disposed at a predetermined position to scan an image recorded thereon;
second scanning means for shifting a second document, which requires a high magnification, to scan rn image recorded thereon;
scanning mirror means having a first mirror for reflecting the scanning light from said first scanning means and a second scanning mirror for reflecting the light reflected by said first scanning mirror, said scanning mirror means integrally shifting said first and second scanning mirrors over a predetermined range to expose a photosensitive material by the light reflected by said second scanning mirror when said first document is scanned by said first scanning means;
movement allowing means for allowing said first and second scanning mirrors to be shifted in excess of said predetermined range; and
a retracting means for retracting said second scanning mirror to allow the photosensitive material to be exposed by the scanning light of said second scanning means so that, when said first and second scanning mirrors are shifted in excess of said predetermined range via said movement allowing means, the scanning light from said second scanning means coincides with the optical path of the scanning light from said first scanning means, which is reflected by said second scanning mirror.

23. A copying apparatus according to claim 22 wherein said first and second mirrors are each disposed so that the optical axis of the scanning light of said first document, which is entered into said first scanning mirror as said first document is scanned, and the optical axis of the light reflected by said second scanning mirror are inverted by 180 degrees.

24. A copying apparatus according to claim 23 wherein said first scanning mirror is disposed so that the incident angle of said scanning light, as said first document is scanned is 45 degrees, and said second scanning mirror is disposed so that the incident angle of the scanning light from said first scanning mirror as said first document is scanned is 45 degrees.

25. A copying apparatus according to claim 22 wherein said second mirror is arranged so that, when it is shifted in excess of said predetermined range, it is retracted by being rotated.

26. A copying apparatus according to claim 22 wherein said movement allowing means comprises a stepped portion, and said second mirror is arranged so that, when shifted in excess of said predetermined range, it is pressed by said stepped portion and rotated.

* * * * *